US010471386B2

(12) United States Patent
Feeney et al.

(10) Patent No.: US 10,471,386 B2
(45) Date of Patent: Nov. 12, 2019

(54) METHOD AND APPARATUS FOR REMOVING MERCURY FROM A FLUE GAS STREAM

(71) Applicant: Babcock & Wilcox Power Generation Group, Inc., Barberton, OH (US)

(72) Inventors: Steven Feeney, Lancaster, OH (US); Mandar R Gadgil, Akron, OH (US)

(73) Assignee: The Babcock & Wilcox Company, Barberton, OH (US)

( * ) Notice: Subject to any disclaimer, the term of this patent is extended or adjusted under 35 U.S.C. 154(b) by 763 days.

(21) Appl. No.: 15/040,345

(22) Filed: Feb. 10, 2016

(65) Prior Publication Data

US 2017/0225120 A1  Aug. 10, 2017

(51) Int. Cl.
| | |
|---|---|
| F23J 7/00 | (2006.01) |
| B01D 53/64 | (2006.01) |
| B01D 53/79 | (2006.01) |
| F23J 15/00 | (2006.01) |
| F23J 15/02 | (2006.01) |

(52) U.S. Cl.
CPC .............. *B01D 53/64* (2013.01); *B01D 53/79* (2013.01); *F23J 15/003* (2013.01); *F23J 15/02* (2013.01); *B01D 2251/108* (2013.01); *B01D 2251/60* (2013.01); *B01D 2258/0283* (2013.01); *F23J 2215/20* (2013.01); *F23J 2215/30* (2013.01); *F23J 2215/60* (2013.01)

(58) Field of Classification Search
CPC ......... B01D 53/64; B01D 53/79; F23J 15/003
USPC ...................................... 431/4; 110/203–217
See application file for complete search history.

(56) References Cited

U.S. PATENT DOCUMENTS

| | | | |
|---|---|---|---|
| 6,855,859 B2 * | 2/2005 | Nolan | B01D 47/06 423/107 |
| 2004/0013589 A1 * | 1/2004 | Vosteen | B01D 53/64 423/210 |

* cited by examiner

*Primary Examiner* — Vivek K Shirsat
(74) *Attorney, Agent, or Firm* — Michael J. Seymour (57) ABSTRACT

The present invention relates generally to the field of emission control equipment for boilers, heaters, kilns, or other flue gas-, or combustion gas-, generating devices (e.g., those located at power plants, processing plants, etc.) and, in particular to a new and useful method and apparatus for capturing, oxidizing, lowering the concentration and/or level of, and/or eliminating mercury present in any flue gas and/or combustion gas stream. In one embodiment, the method and/or apparatus of the present invention is applied to boilers, heaters, kilns, or other flue gas-, or combustion gas-, generating devices that have connected thereto at least one type of flue gas, or combustion gas, scrubber device (i.e., a wet scrubber or a dry scrubber).

57 Claims, 5 Drawing Sheets

METHOD AND APPARATUS FOR REMOVING MERCURY FROM A FLUE GAS STREAM

RELATED APPLICATION DATA

This patent application claims priority to U.S. Provisional Patent Application No. 62/116,061 filed Feb. 13, 2015 and titled "Method and Apparatus for Removing Mercury from a Flue Gas Stream." The complete text of this patent application is hereby incorporated by reference as though fully set forth herein in its entirety.

FIELD AND BACKGROUND OF THE INVENTION

1. Field of the Invention

The present invention relates generally to the field of emission control equipment for boilers, heaters, kilns, or other flue gas-, or combustion gas-, generating devices (e.g., those located at power plants, processing plants, etc.) and, in particular to a new and useful method and apparatus for capturing, oxidizing, lowering the concentration and/or level of, and/or eliminating mercury present in any flue gas and/or combustion gas stream. In one embodiment, the method and/or apparatus of the present invention is applied to boilers, heaters, kilns, or other flue gas-, or combustion gas-, generating devices that have connected thereto at least one type of flue gas, or combustion gas, scrubber device (i.e., a wet scrubber or a dry scrubber).

2. Description of the Related Art

In recent years, the U.S. Department of Energy (DOE) and the U.S. Environmental Protection Agency (EPA) have supported research to measure and control the emissions of Hazardous Air Pollutants (HAPs) from coal-fired utility boilers and waste to energy plants. The initial results of several research projects showed that the emissions of heavy metals and volatile organic carbons (VOCs) are very generally low, except for mercury (Hg). Unlike most of the other metals, most of the mercury remains in the vapor phase and does not substantially condense onto fly ash particles at temperatures typically used in electrostatic precipitators and fabric filters. Therefore, it cannot be collected and disposed of along with fly ash like the other metals in order to meet strict mercury stack emission limits (e.g., MATS in the United States, the European Community's mercury emission limits and/or regulations, and/or any other countries' and/or organization's mercury emission limit guidelines and/or regulations). To complicate matters, mercury can exist in its oxidized ($Hg^{2+}$) form, principally as mercuric halide (e.g., $HgCl_2$, $HgBr_2$, $HgI_2$, etc.), or in its elemental ($Hg^0$) form as vaporous metallic mercury. The relative amount of each species appears to depend on several factors such as fuel type, boiler combustion efficiency, the type of particulate collector installed, and various other factors.

The search for industrially acceptable methods for the capture of mercury from industrial flue gases has included a significant effort to determine how much mercury can be removed by existing, conventional air pollution control equipment, such as wet or dry scrubbers.

Accordingly, tests have been performed on several commercial scale and pilot scale wet scrubbers. In addition to being applicable to dry scrubber situations, these tests have produced some expected and some surprising results. It was generally expected that the oxidized mercury would be easily captured and the elemental mercury would be difficult to capture. These expectations were based on the high solubility of mercuric halides in water and the very low solubility of elemental mercury in water. This expectation was generally fulfilled.

The surprising result concerned elemental mercury. Repeated tests during which the concentration of elemental mercury in the flue gas was measured revealed that more elemental mercury was leaving the wet scrubber than was entering.

While not wishing to be bound to any one theory, it is believed that various ions present in wet scrubber slurries and/or in the flue gas stream of wet and/or dry scrubbers cause reduction of a portion of any oxidized mercury present in a flue gas and/or combustion gas stream converting same back to elemental mercury ($Hg^0$). This portion is then emitted out of the stack of, for example, a power plant as elemental mercury is much more difficult to capture in any one or more downstream emission control devices and/or downstream air quality control system (AQCS) devices.

Thus, there is a need in the art for a method that accomplishes both an acceptable level of mercury oxidation (e.g., "a high degree of mercury oxidation") in a flue gas, or combustion gas, stream as well as a method that simultaneously accomplishes control of mercury emission from a scrubber, be it wet or dry.

SUMMARY OF THE INVENTION

As noted above, the present invention relates generally to the field of emission control equipment for boilers, heaters, kilns, or other flue gas-, or combustion gas-, generating devices (e.g., those located at power plants, processing plants, etc.) and, in particular to a new and useful method and apparatus for capturing, oxidizing, lowering the concentration and/or level of, and/or eliminating mercury present in any flue gas and/or combustion gas stream. In one embodiment, the method and/or apparatus of the present invention is applied to boilers, heaters, kilns, or other flue gas-, or combustion gas-, generating devices that have connected thereto at least one type of flue gas, or combustion gas, scrubber device (i.e., a wet scrubber or a dry scrubber). In another embodiment, the flue gas, or combustion gas, scrubber device is a wet flue gas desulfurization (WFGD) device.

Accordingly, one aspect of the present invention is drawn to a method for oxidizing elemental mercury present in a flue gas, or combustion gas, stream wherein the method comprises the steps of: (I) burning at least one fuel so as to yield a mercury-containing flue gas, or combustion gas, stream wherein at least a portion of the mercury in the mercury-containing flue gas, or combustion gas, stream is elemental mercury; (II) injecting one or more halogen-containing compounds into the mercury-containing flue gas, or combustion gas, stream in order to oxidize at least a portion of the elemental mercury in the mercury-containing flue gas, or combustion gas, stream into oxidized mercury and form one or more corresponding mercury halide compounds; and (III) injecting one or more sulfur-containing compounds and/or sulfide salt compounds into at least one air quality control device in order to convert the one or more mercury halide compounds into one or more insoluble mercury-sulfur compounds.

In yet another aspect of the present invention, there is provided a method for oxidizing and capturing elemental mercury present in a flue gas, or combustion gas, stream wherein the method comprises the steps of: (A) burning at least one fuel so as to yield a mercury-containing flue gas, or combustion gas, stream wherein at least a portion of the mercury in the mercury-containing flue gas, or combustion gas, stream is elemental mercury; (B) injecting one or more halogen-containing compounds into the mercury-containing flue gas, or combustion gas, stream in order to oxidize at least a portion of the elemental mercury in the mercury-containing flue gas, or combustion gas, stream into oxidized mercury and form one or more corresponding mercury halide compounds; (C) injecting one or more sulfur-containing compounds and/or sulfide salt compounds into at least one air quality control device in order to convert the one or more mercury halide compounds into one or more insoluble mercury-sulfur compounds; and (D) capturing the one or more insoluble mercury-sulfur compounds in at least one air quality control device and/or downstream process equipment device.

In yet another aspect of the present invention, either of the above methods further comprises at least one, or both, of the steps of: supplying at least one control device and one or more mercury sensing devices, or sensors, wherein the at least one control device is operatively connected to the one or more mercury sensing devices, or sensors, in order to provide data on at least one of: (i) oxidized mercury concentration level in the flue gas, or combustion gas, stream, (ii) elemental mercury concentration level in the flue gas, or combustion gas, stream, and/or (iii) mercury speciation levels in the flue gas, or combustion gas, stream; and optionally using the data from Step (IV) to determine the amount of either one, or both, of: (a) the one or more halogen-containing compounds that are injected in Step (II), and/or (b) the one or more sulfur-containing compounds and/or sulfide salt compounds that are injected in Step (III). In still yet another aspect of the present invention, the two additional steps detailed above are performed in real-time.

The various features of novelty which characterize the invention are pointed out with particularity in the claims annexed to and forming a part of this disclosure. For a better understanding of the invention, its operating advantages and specific benefits attained by its uses, reference is made to the accompanying drawings and descriptive matter in which exemplary embodiments of the invention are illustrated.

DESCRIPTION OF THE INVENTION

As noted above, the present invention relates generally to the field of emission control equipment for boilers, heaters, kilns, or other flue gas-, or combustion gas-, generating devices (e.g., those located at power plants, processing plants, etc.) and, in particular to a new and useful method and apparatus for capturing, oxidizing, lowering the concentration and/or level of, and/or eliminating mercury present in any flue gas and/or combustion gas stream. In one embodiment, the method and/or apparatus of the present invention is applied to boilers, heaters, kilns, or other flue gas-, or combustion gas-, generating devices that have connected thereto at least one type of flue gas, or combustion gas, scrubber device (i.e., a wet scrubber or a dry scrubber). In another embodiment, the flue gas, or combustion gas, scrubber device is a wet flue gas desulfurization (WFGD) device.

In one embodiment, the present invention provides a method and/or apparatus that simultaneously accomplishes at least the following two objectives. The first objective is to affect the oxidation of elemental mercury ($Hg^0$), such as gas-phase elemental mercury and/or any other elemental mercury in the AQCS train, that is present in any flue gas and/or combustion gas stream into any suitable oxidized state (e.g., $Hg^{2+}$). The second objective of the present invention is to affect the capture of such oxidized mercury by converting, binding and/or precipitating such oxidized mercury into a chemical form that is considered insoluble in an aqueous environment (i.e., a water-based environment). In one embodiment, the oxidized mercury is captured by converting any one or more compounds carrying oxidized mercury into an insoluble mercury (II) sulfide. Mercury (II) sulfide has a solubility constant of between $3\times10^{-52}$ and $2\times10^{-54}$. Thus, for the purposes of meeting various stack mercury emission regulations the conversion of various oxidized mercury-containing compounds into mercury sulfide permits the precipitation and thus capture and removal of mercury from a flue gas, or combustion gas, stream.

An optional third objective of the present invention is the control of elemental mercury emission across a $SO_x$ scrubber (e.g., a wet FGD, or dry FGD), a reduction in and/or a lowering of the concentration and/or level of elemental mercury that is either emitted and/or present in a flue gas stream, and/or the elimination of at least a portion of any mercury that may be emitted from any type of flue gas desulfurization unit such as a wet flue gas desulfurization (WFGD) unit and/or dry flue gas desulfurization (DFGD) unit. In some instances emission of mercury from a wet, or dry, scrubber is termed "re-emission" in that a portion of what was previously oxidized mercury is reduced in the scrubber environment to elemental mercury and then is able to "escape" the scrubber and is emitted at, for example, the stack as elemental mercury. For the purposes of this patent application, any oxidized mercury that is reduced in a scrubber environment and then subsequently escapes and is emitted at a stack will be considered mercury emission and shall include any mercury that could be considered to fall under the term re-emission as used by those skilled in the art. An optional fourth objective of the present invention is to integrate the mercury oxidation process and the mercury capture process by using at least one suitable mercury sensing device or sensor (e.g., a gas-phase mercury concentration probe, a gas-phase mercury speciation probe, an aqueous-phase mercury concentration probe, an aqueous-phase mercury speciation probe, etc., or even any combination of two or more probes and/or probe types, three or more probes and/or probe types, or four or more probes and/or probe types) to determine the amount of various types of mercury (i.e., oxidized mercury, elemental mercury and/or various mercury-containing compounds, regardless of whether such mercury and/or mercury-containing compounds are gas-phase, liquid phase, and/or solid phase compounds) present at various locations in one or more boilers, heaters, kilns, or other flue gas-, or combustion gas-, generating devices and/or any one or more emission control devices and/or air quality control system (AQCS) devices so as to permit a more exact level of mercury control throughout the whole flue gas, or combustion gas stream through the use of at least one feedback loop, logic control system, or other automated system. An optional fifth objective of the present invention is to integrate the gas-phase mercury oxidation process and the mercury capture process while permitting the control of mercury re-emission, the reduction in and/or the lowering of the concentration and/or level of elemental mercury that is either emitted and/or present in a flue gas stream, and/or the elimination of at least a portion of any mercury that may be emitted from any type of flue gas desulfurization unit by using at least one suitable mercury sensing device or sensor (e.g., a gas-phase mercury concentration probe, a gas-phase mercury speciation probe, an aqueous-phase mercury concentration probe, an aqueous-phase mercury speciation probe, etc., or even any combination of two or more probes and/or probe types, three or more probes and/or probe types, or four or more probes and/or probe types) to determine the amount of various types of mercury (i.e., oxidized mercury, elemental mercury and/or various mercury-containing compounds, regardless of whether such mercury and/or mercury-containing compounds are gas-phase, liquid phase, and/or solid phase compounds) present at various locations in one or more boilers, heaters, kilns, or other flue gas-, or combustion gas-, generating devices and at at least one location in a flue gas desulfurization unit so as to permit a more exact level of mercury control throughout the whole flue gas, or combustion gas stream through the use of at least one feedback loop, logic control system, or other automated system. This fifth objective can further include determining the amount of various types of mercury at any one or more locations in any one or more other emission control devices and/or air quality control system (AQCS) devices beyond a flue gas desulfurization unit.

In light of the above, the present invention utilizes any suitable technique to accomplish mercury oxidation. Such techniques include, but are not limited to, adding, placing, injecting or combining with the fuel (e.g., coal, fuel oil, other fossil fuels, biomass, or a blend of biomass with one or more fossil fuels, etc.) for a boiler, heater, kiln, or other flue gas-, or combustion gas-, generating device one or more halogen-containing compounds. Such act of adding, placing, injecting or combining one or more halogen-containing compounds with the fuel for a boiler, heater, kiln, or other flue gas-, or combustion gas-, generating device can occur on the fuel itself (e.g., on the coal, the coal belt, in the coal pulverizer, on the biomass, mixed in with the biomass, etc.), in one or more burners, at one or more places in the boiler, heater, kiln, or other flue gas-, or combustion gas-, generating device (e.g., an economizer pass, one or more burners, a combustion grate, etc.), at one or more places in the flue gas, or combustion gas, stream after exit from the boiler/furnace, at one or more places in any one or more emission control, or AQCS, devices, etc. Thus, it should be understood that when the phrase "injecting one or more halogen-containing compounds into the mercury-containing flue gas, or combustion gas, stream" is utilized herein and/or in the claims, that such phrase is to be broadly construed to include all forms of injection and all possible injection points including, but not limited to, onto the fuel itself (e.g., on the coal, the coal belt, in the coal pulverizer, on the biomass, mixed in with the biomass, etc.), directly or indirectly into one or more of the burners or other devices used to combust such fuel, at one or more places in the boiler, heater, kiln, or other flue gas-, or combustion gas-, generating device (e.g., an economizer pass, one or more burners, a combustion grate, etc.), at one or more places in the flue gas, or combustion gas, stream after exit from the boiler/furnace, at one or more places in any one or more emission and/or emissions control (generically referred to herein as emission control), or AQCS, devices, etc.

Such halogen-containing compounds include, but are not limited to, one or more chlorine-containing compounds, one or more bromine-containing compounds, one or more iodine-containing compounds, or any combination of two or more thereof, three or more thereof, four or more thereof, or even five or more thereof. The one or more chlorine-containing compounds include, but are not limited to, one or more inorganic chlorine compounds, organic chlorine-containing compounds, one or more diatomic chlorine compounds, or any combination of two or more thereof, three or more thereof, four or more thereof, or even five or more thereof. The one or more bromine-containing compounds include, but are not limited to, one or more inorganic bromine compounds, organic bromine-containing compounds, one or more diatomic bromine compounds, or any combination of two or more thereof, three or more thereof, four or more thereof, or even five or more thereof. The one or more iodine-containing compounds include, but are not limited to, one or more inorganic iodine compounds, organic iodine-containing compounds, one or more diatomic iodine compounds, or any combination of two or more thereof, three or more thereof, four or more thereof, or even five or more thereof. In another embodiment, any combination of one or more, two or more, three or more, four or more, or even five of more halogen-containing compounds containing different halogen portions thereof can be used together. Thus, in this embodiment any suitable number of chlorine-containing compounds discussed herein can be combined with any suitable number of bromine-containing compounds and/or any suitable number of iodine-containing compounds. In still another embodiment the halogen-containing compound utilized in the various methods of the present invention contains at least one of the chlorine-containing compounds discussed herein in combination with at least one of the bromine-containing compounds discussed herein and in further combination with at least one of the iodine-containing compounds discussed herein.

Non-limiting examples of the above compounds include alkali-metal halides (e.g., NaCl, NaBr, NaI, KCl, KBr, KI, etc.), any alkali-metal halogen-containing compounds (e.g., $NaClO_2$, $NaClO_3$, $NaClO_4$, $NaBrO_3$, $NaIO_3$, $NaIO_4$, $Na_5IO_6$, $Na_3H_2IO_6$, KClO, $KClO_3$, $KClO_4$, $KBrO_3$, $KIBr_2$, $KIO_3$, $KIO_3.HIO_3$, $KIO_3.2HIO_3$, $KIO_4$, $KI_3.½H_2O$, etc.), any alkali-earth halogen-containing compounds (e.g., $MgCl_2$, $MgBr_2$, $MgI_2$, $CaCl_2$, $CaBr_2$, $CaI_2$, $Ca(ClO_3)_2$, $(CaClO_4)_2$, $Ca(BrO_3)_2$, $Ca(IO_3)_2$, etc.), any compound that contains at least two different halogens (e.g., BrCl, IBr, $IBr_3$, ICl, $ICl_3$, etc.), any compound that contains at least one halogen and oxygen (e.g., $ClO_2$, $Cl_2O_7$, $Cl_2O$, $ClO_4$, $Cl_2O_8$, $BrO_2$, $Br_2O$, $Br_3O_8$, $IO_2$, $I_2O_4$, $I_2O_5$, $I_4O_9$, etc.), any compound that contains at least one halogen and hydrogen (e.g., HCl, $HClO_3$, $HClO_4$, HBr, $HBrO_3$, HI, $HIO_3$, etc.), any diatomic halogen-containing compounds (e.g., $Cl_2$, $Br_2$, $I_2$, etc.), any organic compounds that contain therein at least one atom of chlorine, bromine, and/or iodine, or any combination of two or more thereof, or even all three thereof. It should be noted that any of the above classes of compounds can be used in either the anhydrous form and/or any hydrated form (if one or both of such compounds are available). Although the above compounds are represented by the anhydrous forms such forms are meant to encompass all available hydrated forms and related forms of such compounds that are known to those of skill in the art.

In one embodiment, the present invention provides a means in a wet or dry scrubber to rapidly precipitate at least a portion of any aqueous oxidized mercury, or other form of oxidized mercury (e.g., a gas-phase form), in the scrubber before it can be reduced by other factors, ions, and/or compounds that may be present therein. One of the most insoluble forms of mercury is mercuric sulfide, which in mineral form is cinnabar. One means for supplying a source of sulfide to react with the oxidized mercury is aqueous sulfide ions. Thus, at the gas/liquid interface in the scrubber, the following reaction is proposed for the absorption and precipitation of ionized (oxidized) mercury:

$$S^{2-}_{(aq)}+HgCl_{2(g)}\rightarrow HgS_{(s)}+2Cl^-_{(aq)}$$

$$S^{2-}_{(aq)}+HgBr_{2(g)}\rightarrow HgS_{(s)}+2Br^-_{(aq)}$$

$$S^{2-}_{(aq)}+HgI_{2(g)}\rightarrow HgS_{(s)}+2I^-_{(aq)}$$

HgS has a solubility product of approximately $3\times10^{-52}$ and therefore precipitates essentially completely. The aqueous sulfide species is added to the scrubbing liquor of the scrubber and comes into contact with the mercury in the flue gas, such that HgS is formed when the mercury is absorbed into the liquor. Therefore, the oxidized mercury will rapidly precipitate as cinnabar in the scrubber and thereby prevent the reduction of that mercury back to sparingly soluble elemental mercury. The precipitation of mercury as cinnabar has a distinct advantage over other mercury sequestering methods in that it converts mercury to a very insoluble form.

Accordingly, one aspect of the present invention is drawn to an improvement in a method using a scrubber for receiving and scrubbing an industrial gas containing mercury, the improvement comprising: adding an aqueous sulfide salt to the industrial gas and scrubbing the industrial gas in the scrubber. The method according to the present invention is particularly suited to the task of reducing mercury emissions in an industrial process which burns coal in a furnace to produce an exhaust flue gas, including conveying the exhaust flue gas through a dust collector, such as a fabric filter or electrostatic precipitator.

Another aspect of the present invention is drawn to an apparatus using a scrubber for receiving and scrubbing an industrial gas containing mercury with an aqueous alkali reagent, and particularly the improvement comprising: means for providing sulfide ions and means for controlling the sulfide ions provided to the industrial gas in the scrubber. The present invention is again particularly suited to utility installations which burn fossil fuels such as coal, or solid wastes, and which use a dust collector (such as an electrostatic precipitator or a fabric filter), in addition to the scrubber, and/or other conventional components for reducing emissions to the atmosphere.

Another aspect of the present invention is drawn to an apparatus for receiving and scrubbing an industrial gas containing mercury with an aqueous alkali reagent, comprising a scrubber, having a scrubber liquor, for scrubbing the industrial gas with the aqueous alkali reagent; flue means for conveying the industrial gas to the scrubber; means for providing sulfide ions; and means for controlling the sulfide ions provided to the industrial gas. The present invention is again particularly suited to utility installations which burn fossil fuels, such as coal, and can be incorporated into a wet and/or or dry scrubber.

All aspects of the present invention contemplate means for providing sulfide ions, including but not limited to bisulfide (HS⁻) ions. Notably, such bisulfide ions (HS⁻) provide sulfide ions (S²⁻) by virtue of the equilibrium in an aqueous solution:

$$S^{2-}_{(aq)}+H_2O\leftrightharpoons HS^-_{(aq)}+OH^-_{(aq)}$$

This means can be accomplished through the addition of one or more aqueous sulfide compounds, or species, including, but not limited to, sulfidic waste water, kraft caustic liquor, kraft carbonate liquor, potassium sulfide, sodium sulfide, sodium hydrogen sulfide (NaHS), thioacetamide, or suitable mixtures of two or more thereof, suitable mixtures of three or more thereof, or even suitable mixtures of four or more thereof to the scrubbing liquor in the scrubber. In another embodiment, any suitable inorganic source of aqueous sulfide species can be utilized herein as the later described one or more sulfide precipitating agents. Further, control means, such as a separate storage tank and metering pump, can be employed to selectively control the provision of sulfide to meet specific operational requirements.

This system has an inherent safety advantage in that no H₂S, which is odorous and toxic, is accumulated or stored. Further, the system is versatile in that it is equally applicable to wet and/or dry scrubbers and can be incorporated into current emissions control systems with minimal modifications or additions.

Figure 1:
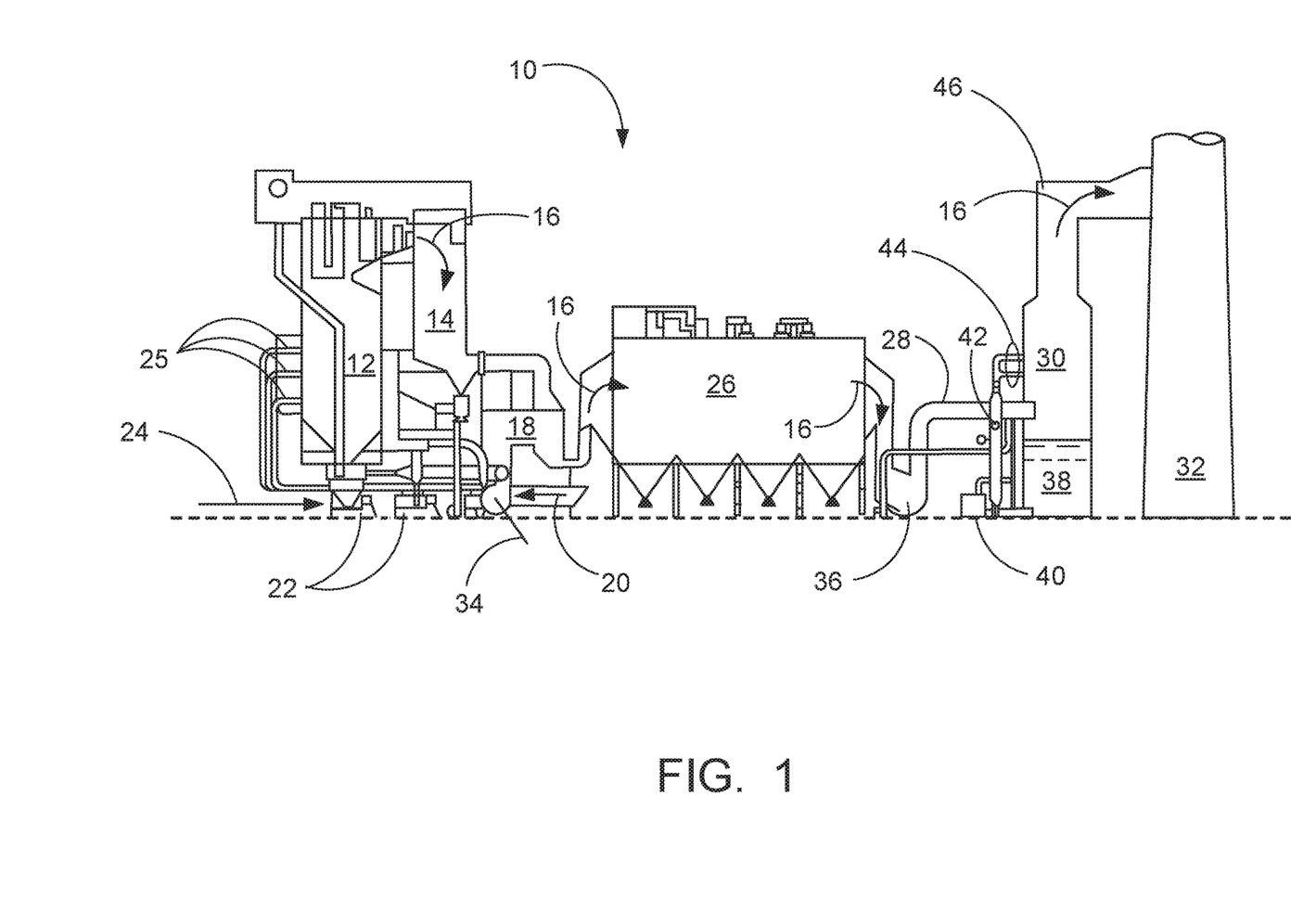
FIG. 1 is an illustration of a coal-fired boiler installation.

Referring to the drawings generally, wherein like reference numerals designate the same or functionally similar elements throughout the several drawings, and to FIG. 1 in particular, FIG. 1 illustrates a coal-fired utility boiler installation of the type used by utilities in the generation of electric power, generally designated 10, and which represents one type of industrial process to which the present invention is applicable. In its broadest form, the present invention comprises a method for removing mercury from the flue gas generated during the combustion of fossil fuels or solid wastes through the use of aqueous sulfide ions. Of course, while the aforementioned coal-fired utility boiler installations are but one example, and the method of the present invention will likely first find commercial application to the removal of mercury from the flue gases produced by such utility boiler installations which combust such fossil fuels, any industrial process using a wet scrubber type of absorber module to purify such flue gases may benefit. Such processes could include incineration plants, waste to energy plants, or other industrial processes which generate gaseous products containing mercury. Thus for the sake of convenience, the terms industrial gas, flue gas, or simply gas will be used in the following discussion to refer to any gas from an industrial process and from which an objectionable component, such as mercury, is to be removed.

As will be described herein, an alternate embodiment of the present invention involves methods and apparatus for the addition of aqueous sulfide ions to industrial gases which are treated by dry scrubber flue gas desulfurization systems. Thus, while the majority of the following description is presented in the context of the present invention as being applied to wet scrubber systems, it will be appreciated that the present invention is not limited thereto. Further, since both wet and dry scrubbers remove sulfur species from the flue gas by introduction of an alkali sorbent, some common terminology is used for the sake of convenience. In the case of wet scrubbers, the alkali sorbent can be provided as an aqueous alkali solution or slurry; in dry scrubbers, the alkali sorbent is usually provided as an aqueous alkali slurry. Thus, for the sake of convenience in the following description, the term aqueous alkali reagent will be used to encompass both aqueous alkali solutions and/or aqueous alkali slurries as appropriate to the type of scrubber means being used.

As illustrated in FIG. 1, and proceeding in the direction of flue gas flow generated during the combustion process, the boiler installation 10 includes a furnace 12 having a gas outlet 14 which conveys flue gases, generally designated 16, to an air heater 18 used to preheat incoming air 20 for combustion. In this exemplary embodiment, pulverizers 22 grind a fossil fuel 24 (e.g., coal) to a desired fineness and the pulverized coal 24 is conveyed via burners 25 into the furnace 12 where it is burned to release heat used to generate steam for use by a steam turbine-electric generator (not shown). Flue gas 16 produced by the combustion process is conveyed through the gas outlet 14 to the air heater 18 and thence to various types of downstream flue gas cleanup equipment. The flue gas cleanup equipment can comprise a fabric filter or, as shown, an electrostatic precipitator (ESP) 26 which removes particulates from the flue gas 16. A flue 28 downstream of the ESP 26 conveys the flue gas 16 to a wet scrubber absorber module 30 which is used to remove sulfur dioxide and other contaminants from the flue gas 16. Flue gas 16 exiting from the wet scrubber absorber module or, simply, the wet scrubber 30, is conveyed to a stack 32 and exhausted to atmosphere. Forced draft fans 34 and induced draft fans 36 are used to propel the air 20, fuel 24, and flue gases 16 through the installation 10. For further details of various aspects of such installations 10, the reader is referred to *Steam/its generation and use,* 41$^{st}$ Edition, Kitto and Stultz, Eds., Copyright 2005, The Babcock & Wilcox Company, Barberton, Ohio, U.S.A., particularly to Chapter 35—Sulfur Dioxide Control, the text of which is hereby incorporated by reference as though fully set forth herein. While the aforementioned *Steam* reference contains a description of one form of wet scrubber 30 produced by The Babcock & Wilcox Company (B&W) and to which the present invention is applicable, the present invention is not limited to such B&W wet scrubber designs. Persons skilled in the art will appreciate that the principles of the present invention apply equally well to other types of wet scrubber designs, available from other manufacturers.

The wet scrubber 30 contains, in a lower portion thereof, an inventory of scrubber liquor 38. During operation of the wet scrubber 30, recirculation pumps 40 pump and recirculate the scrubber liquor 38 up through pipes 42 and into absorber spray headers 44 (see FIG. 2 for an internal illustration of spray headers 44 in wet scrubber 30) located in an upper portion of the wet scrubber 30. The scrubber liquor 38 is sprayed into the flue gas 16 where it absorbs $SO_2$. The scrubber liquor 38 falls down through various devices and drains back into the lower portion of the wet scrubber 30. The scrubbed flue gas 16 then exits from a wet scrubber outlet 46 and is eventually conveyed to the stack 32.

Figure 2:
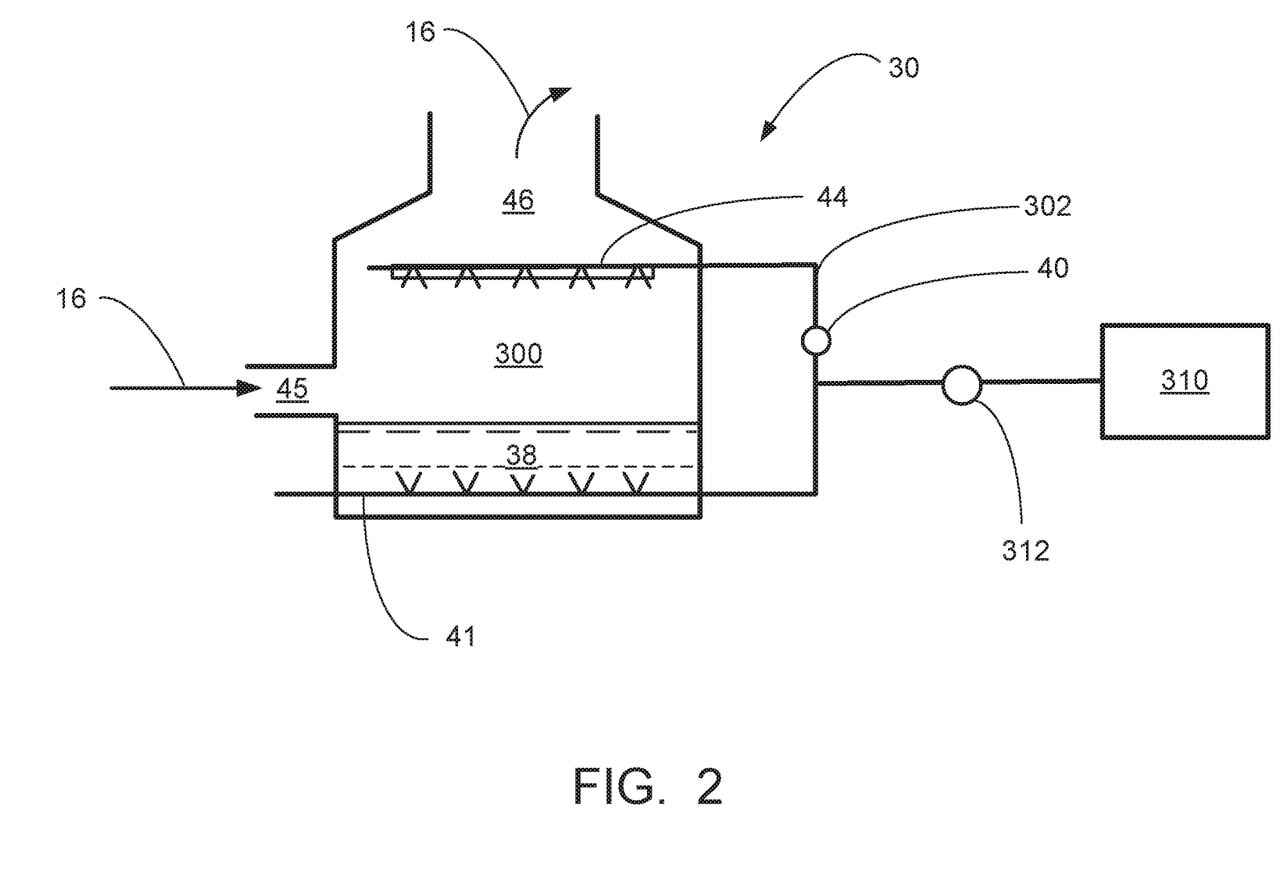
FIG. 2 is an illustration of the mercury emission control portion of the present invention.

FIG. 2 depicts a detailed schematic of one possible embodiment of the wet scrubber 30. Wet scrubber 30 comprises a main chamber 300 with scrubber inlet 45 and scrubber outlet 46. As above, main chamber 300 has a lower portion containing an inventory of scrubber liquor 38 which recirculates from the main chamber 300 into absorber spray headers 44 by means of general recirculation line 302. General recirculation line 302 can comprise pipes 42 and recirculation pumps 40. Frequently, the lower portion of main chamber 300 containing scrubber liquor 38 will include means for injecting air, such as air sparger 41, into the scrubber liquor 38. The use of air sparger 41 oxidizes the products of $SO_2$ absorption in scrubbing liquor 38. Finally, scrubber liquor 38 can be contained in a bulk storage vessel which forms the lower portion of main chamber 300 (as pictured), or it can comprise a separate holding tank connected to a drain in the main chamber 300 and recirculation line 302.

A sulfide-containing salt can be added directly to scrubber liquor 38 and mixed with the flue gas 16 via spray headers 44, thereby creating an aqueous sulfide ion solution (hereafter referred to as an aqueous sulfide species). In turn, by injecting this aqueous sulfide species directly into recirculation pump 40 and/or general recirculation line 302, the added sulfide solution will not be prematurely oxidized before contacting and scrubbing flue gas 16 in the main chamber 300. In another embodiment, the source of the sulfide ions can be provided by means of sulfidic waste water, kraft caustic liquor, kraft carbonate liquor, or an aqueous solution containing potassium sulfide, sodium sulfide, sodium hydrogen sulfide (NaHS), thioacetamide, or any combination of two or more thereof, three or more thereof, four or more thereof, or even five or more thereof.

Alternatively, sulfide ion solution can be added to an isolated sulfide storage tank 310 which is connected to recirculation line 302 upstream of recirculation pump 40. This is but one possible addition and/or injection point out of numerous places where sulfide ions and/or a sulfide ion solution in accordance with the present invention can be added and/or injected and is by no means meant to be seen in any manner as limiting and/or exhaustive of any other possible addition and/or injection points. Further, a metering pump 312 can be employed to control the flow of sulfide ions into the wet scrubber 30 and, more particularly, into and/or through recirculation line 302 (a system employing metering pump 312 for control of sulfide into recirculation line 302 only is shown). The concentration of sulfide ion and/or rate of flow into and/or through the recirculation line 302 permits the selective control of the scrubber's overall mercury removing ability. Thus, a coordinated control system, such as using storage tank 310 and/or metering pump 312, is one possible embodiment of the present invention. The rate of sulfide addition must be proportional to the flue gas flow rate through the scrubber.

In operation, flue gas 16 flows from inlet 45 into main chamber 300. Sulfide ions added to recirculation line 302 allow spray header 44 to mix the sulfide ions and scrubber liquor 38 with the flue gas 16. This contact initiates the chemical reaction which removes mercury. The flue gas then flows through outlet 46 and into the stack 32. The precipitated mercury remains in scrubber liquor 38 and can be subsequently removed and disposed of by various methods known to those skilled in the art.

Figure 3:
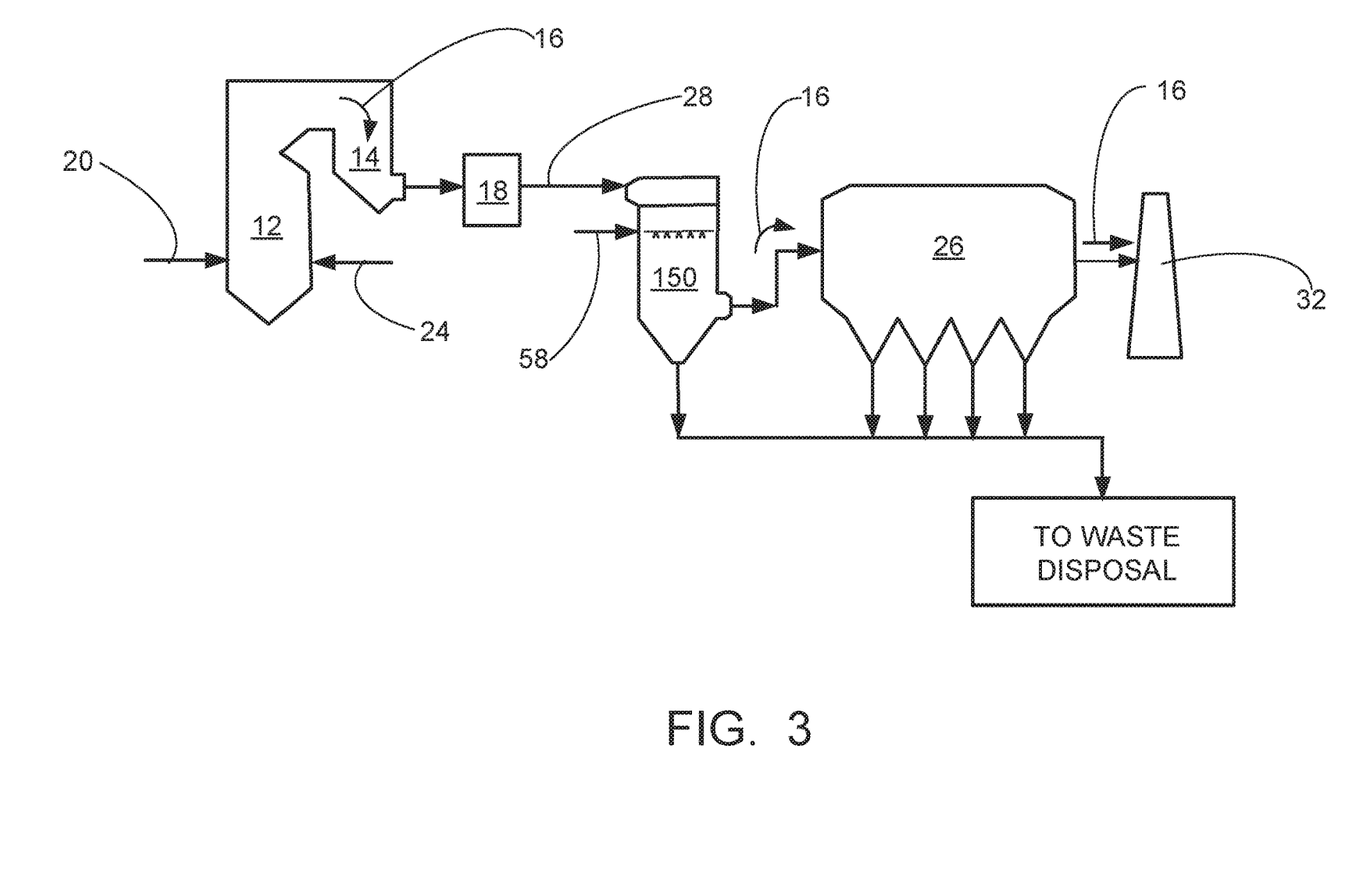
FIG. 3 is an illustration of another embodiment of the mercury emission control portion of the present invention.

As described earlier and as illustrated in FIG. 3, the present invention is also applicable to combustion systems employing dry scrubbers for flue gas desulfurization. Again, like reference numerals designate the same or functionally similar parts. Flue gas 16 produced by the combustion process are conveyed through the gas outlet 14 to the air heater 18 and thence to various types of downstream flue gas cleanup equipment. A flue 28 conveys the flue gas 16 to a dry scrubber absorber module 150 which is used to remove sulfur dioxide and other contaminants from the flue gas 16. Flue gas 16 exiting from the dry scrubber 150 is conveyed to a fabric filter or, as shown, an electrostatic precipitator (ESP) 26 which removes particulates from the flue gas 16 and then the flue gas 16 is conveyed to a stack 32 and exhausted to the atmosphere. Regarding arrow 58, arrow 58 represents an input line, or supply line, for the injection of sorbent, or absorbent, for use in dry scrubber 150 from vessel 401 (see FIG. 4) that contains therein scrubber liquor 38 (see FIG. 4). As in FIG. 1, forced draft fans 34 and induced draft fans 36 (not shown in FIG. 3) are used to propel the air 20, fuel 24, and flue gases 16 through the installation 10 as before.

Figure 4:
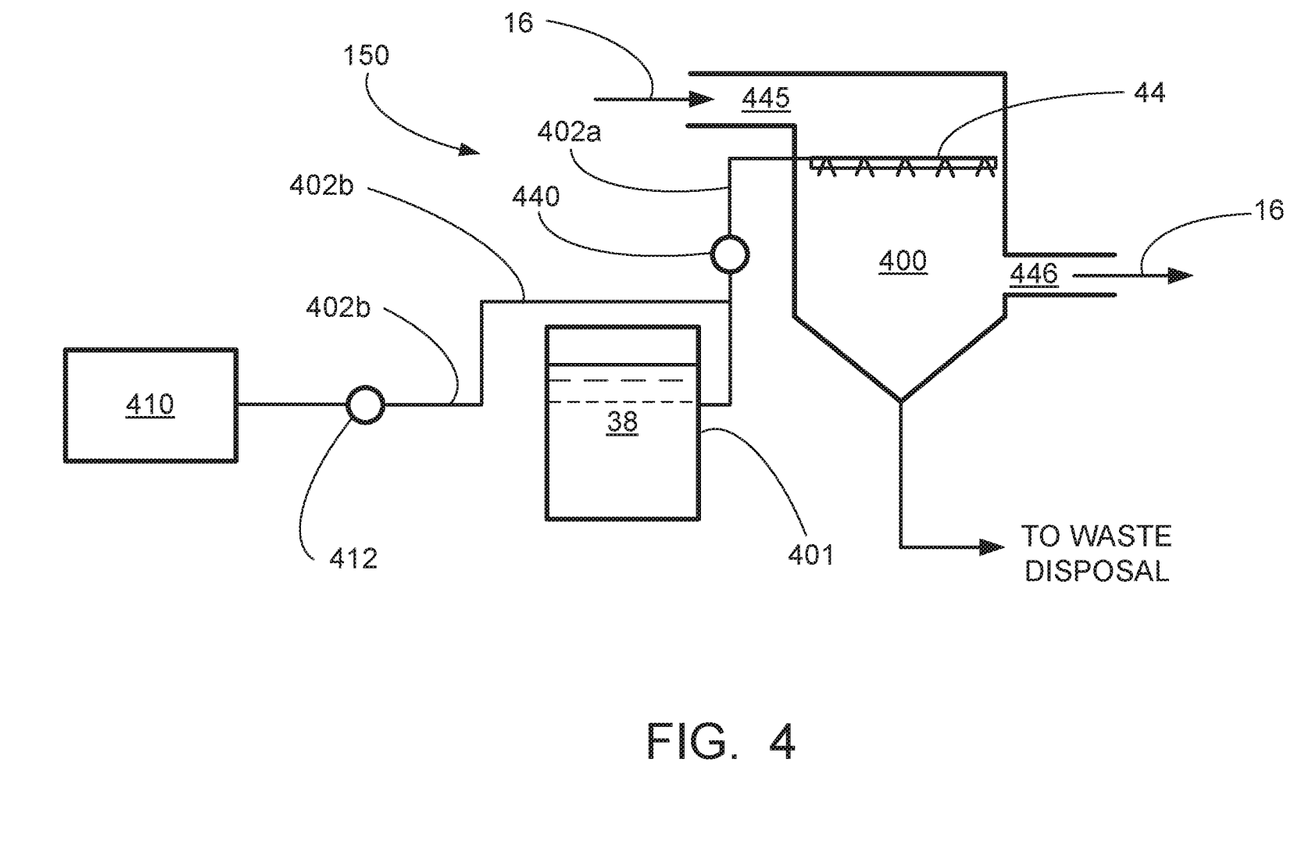
FIG. 4 is an illustration of still another embodiment of the mercury emission control portion of the present invention.

FIG. 4 depicts a detailed schematic of one possible embodiment of a dry scrubber 150. Dry scrubber 150 comprises a main chamber 400 with spray header 44, scrubber inlet 445, and scrubber outlet 446. Notably, scrubber liquor 38 can be contained in a bulk storage vessel 401 and provided to main chamber 400 by means of first feed line 402a. Feed line 402a can contain a scrubber liquor feed pump 440.

A sulfide-containing salt can be added directly to scrubber liquor 38 in vessel 401, pumped to main chamber 400 via first feed line 402a, and mixed with flue gas 16 via spray headers 44. In another embodiment, sulfide ions can be provided by means of sulfidic waste water, kraft caustic liquor, kraft carbonate liquor, or an aqueous solution containing potassium sulfide, sodium sulfide, sodium hydrogen sulfide (NaHS), thioacetamide, or any combination of two or more thereof, three or more thereof, four or more thereof, or even five or more thereof.

Alternatively, sulfide ion solution can be added to an isolated sulfide storage tank 410 and introduced into the main chamber 400 via spray header 44. It should be noted that addition via a solution form is only one possible embodiment, other exemplary manners of addition include, but are not, slurry, moist powder, powder, etc. Tank 410 is connected to second feed line 402b. Further or in the alternative, a metering pump 412 can be employed to control the flow of sulfide ions into the dry scrubber 150 and, more particularly, into feed line(s) 402a and/or bulk storage vessel 401 (a system employing metering pump 412 for control of feed line 402a only is pictured). The concentration of sulfide ion and/or rate of flow into and/or through the feed line(s) 402a and/or 402b permits the selective control of the scrubber's overall mercury removing ability. Thus, a coordinated control system, such as using storage tank 410 and/or metering pump 412, is one possible embodiment of the present invention. However, control of sulfide ions provided to the gas can also be achieved by periodic and/or manual addition of the aqueous sulfide ions into the scrubber system by way of a valve, port, or other injection device or by means of a separate system (i.e., chamber, storage means, spray headers, and/or recirculation line).

In operation, flue gas 16 flows from inlet 445 into main chamber 400. Sulfide ions added to feed line 402a and/or bulk storage vessel 401 allow spray header 44 to mix the sulfide ions and scrubber liquor 38 with the flue gas 16. This contact initiates the chemical reaction which removes mercury. The flue gas then flows through outlet 446 and into the stack 32 (see FIG. 3). The precipitated mercury remains in the dried solid product of scrubber 150 (see FIG. 3) and can be subsequently removed and disposed of by various methods known to those skilled in the art.

Advantages of the present invention include the fact that the cost of control of mercury emissions according to the present invention is relatively low compared to the costs for control of other hazardous air pollutants. Further, the use of aqueous sulfide ions can be incorporated with minimal modifications or additions to current emissions control systems. Most significantly, use of aqueous sulfide ions eliminates the need to produce or have available toxic gases, such as hydrogen sulfide gas, which, when mixed with flue gas containing mercury oxidized by an aqueous alkali reagent can be another method for removing mercury from flue gas. Also, aqueous sulfide ions can be easily metered into the main scrubbing liquor inventory at a specific, desired rate in order to enhance efficiency of the scrubber or to achieve specific results.

According to the present invention, the mercury in the flue gas 16 ends up as mercuric sulfide (also known as cinnabar). This is the chemical form that mercury is most often found in nature and is probably the most desirable chemical form to sequester mercury.

Thus, the present invention is, in one embodiment, a combination of two technologies necessary for a WFGD system to achieve Hg MATS compliance, up-front mercury oxidation in a flue, or combustion, gas prior to entrance of same into a WFGD system, and then the addition of one or more additives to sub-saturate the liquid phase of the WFGD absorber slurry to permit "capture" of such oxidized mercury as an insoluble, or nearly insoluble, compound such as, for example, mercuric sulfide (i.e., cinnabar). In another embodiment, the present invention also permits up-front mercury oxidation in a flue, or combustion, gas prior to entrance of same into a DFGD system, and then the addition of one or more additives to a DFGD to convert some portion of such oxidized mercury into an insoluble, or nearly insoluble, form so that such oxidized mercury can be "captured" in any appropriate AQCS device in the form of, for example, mercuric sulfide (i.e., cinnabar).

As discussed herein, various methods including the use of one or more halogen-containing compounds can be utilized to achieve mercury oxidation in a flue gas, or combustion gas, stream. Although a detailed discussion of a method that utilizes one or more halogen-containing compounds to achieve gas-phase mercury oxidation is discussed herein, the present invention is not limited to solely this method to achieve mercury oxidation. Rather, any mercury oxidation method known to those of skill in the art can be utilized such as one or more catalytic methods, one or more SCR-based methods, one or more chemical additive-based methods (e.g., the use of one or more halogen-containing compounds, or other mercury oxidation achieving compounds), or any two or more of the above, or other known, mercury oxidation methods that can achieve mercury oxidation in a flue gas, or combustion gas, stream.

In one embodiment, the various methods of the present invention utilize a method and/or chemical additive that achieve a high degree of mercury oxidation in a flue gas, or combustion gas, stream while minimizing the negative, or deleterious, effects produced from the execution of such a mercury oxidation method. As utilized herein, "a high degree of mercury oxidation" means that at least about 70 weight percent, at least about 75 weight percent, at least about 80 weight percent, at least about 85 weight percent, at least about 90 weight percent, at least about 92.5 weight percent, at least about 95 weight percent, at least about 97.5 weight percent, or even at least about 98 weight percent of any elemental mercury (i.e., $Hg^0$) present in a flue gas, or combustion gas, stream is oxidized to at least one oxidized mercury state (e.g., $Hg^+$, $Hg^{2+}$, etc.). In one embodiment, the mercury oxidation methods of the present invention are designed to achieve the oxidation of the majority (i.e., more than about 50, about 60, about 70, about 80, about 90, about 95, or even about 99 percent by weight) of elemental mercury to $Hg^{2+}$. In another embodiment the methods of the present invention achieve the oxidation of at least about 50 weight percent of the elemental mercury (i.e., $Hg^0$) in a flue gas, or combustion gas, stream to at least one oxidized mercury state (e.g., $Hg^+$, $Hg^{2+}$, etc.), or at least about 55 weight percent of the elemental mercury (i.e., $Hg^0$) in a flue gas, or combustion gas, stream to at least one oxidized mercury state (e.g., $Hg^+$, $Hg^{2+}$, etc.), or at least about 60 weight percent of the elemental mercury (i.e., $Hg^0$) in a flue gas, or combustion gas, stream to at least one oxidized mercury state (e.g., $Hg^+$, $Hg^{2+}$, etc.), or at least about 65 weight percent of the elemental mercury (i.e., $Hg^0$) in a flue gas, or combustion gas, stream to at least one oxidized mercury state (e.g., $Hg^+$, $Hg^{2+}$, etc.), or at least about 70 weight percent of the elemental mercury (i.e., $Hg^0$) in a flue gas, or combustion gas, stream to at least one oxidized mercury state (e.g., $Hg^+$, $Hg^{2+}$, etc.), or at least about 75 weight percent of the elemental mercury (i.e., $Hg^0$) in a flue gas, or combustion gas, stream to at least one oxidized mercury state (e.g., $Hg^+$, $Hg^{2+}$, etc.), or at least about 80 weight percent of the elemental mercury (i.e., $Hg^0$) in a flue gas, or combustion gas, stream to at least one oxidized mercury state (e.g., $Hg^+$, $Hg^{2+}$, etc.), or at least about 85 weight percent of the elemental mercury (i.e., $Hg^0$) in a flue gas, or combustion gas, stream to at least one oxidized mercury state (e.g., $Hg^+$, $Hg^{2+}$, etc.), or at least about 90 weight percent of the elemental mercury (i.e., $Hg^0$) in a flue gas, or combustion gas, stream to at least one oxidized mercury state (e.g., $Hg^+$, $Hg^{2+}$, etc.), or at least about 92.5 weight percent of the elemental mercury (i.e., $Hg^0$) in a flue gas, or combustion gas, stream to at least one oxidized mercury state (e.g., $Hg^+$, $Hg^{2+}$, etc.), or at least about 95 weight percent of the elemental mercury (i.e., $Hg^0$) in a flue gas, or combustion gas, stream to at least one oxidized mercury state (e.g., $Hg^+$, $Hg^{2+}$, etc.), or at least about 97.5 weight percent of the elemental mercury (i.e., $Hg^0$) in a flue gas, or combustion gas, stream to at least one oxidized mercury state (e.g., $Hg^+$, $Hg^{2+}$, etc.), or at least about 98 weight percent of the elemental mercury (i.e., $Hg^0$) in a flue gas, or combustion gas, stream to at least one oxidized mercury state (e.g., $Hg^+$, $Hg^{2+}$, etc.), or even at least about 99 weight percent of the elemental mercury (i.e., $Hg^0$) in a flue gas, or combustion gas, stream to at least one oxidized mercury state (e.g., $Hg^+$, $Hg^{2+}$, etc.). Here, as well as elsewhere in the specification and claims, individual numerical values can be combined to form additional and/or non-disclosed ranges.

Thus, in one embodiment, one or more iodine-containing compounds, or chemical additives, are utilized to achieve a desired level of mercury oxidation. One non-limiting advantage to the use of one or more iodine-containing compounds is that such a mercury oxidation method can utilize lower iodine levels to achieve a desired level of mercury oxidation. This in turn results in the flue gas, or combustion gas, stream, having a lower corrosion potential while still resulting in a mercury oxidation of, in one embodiment, at least about 87.5 weight percent of any elemental mercury present in a flue gas, or combustion gas, stream. In another embodiment, the use of one or more iodine-containing compounds, or chemical additives, are utilized to achieve a mercury oxidation of, in one embodiment, at least about 90 weight percent, at least about 92.5 weight percent, at least about 95 weight percent, at least about 97.5 weight percent, or even at least about 98 weight percent of any elemental mercury present in a flue gas, or combustion gas, stream. Here, as well as elsewhere in the specification and claims, individual numerical values can be combined to form additional and/or non-disclosed ranges. With such elevated mercury oxidation levels in the flue gas, this allows the above described one or more sulfide precipitating agents including, but not limited to, those described herein to be used in the WFGD absorber to meet, for example, an Hg MATS limit.

Figure 5:
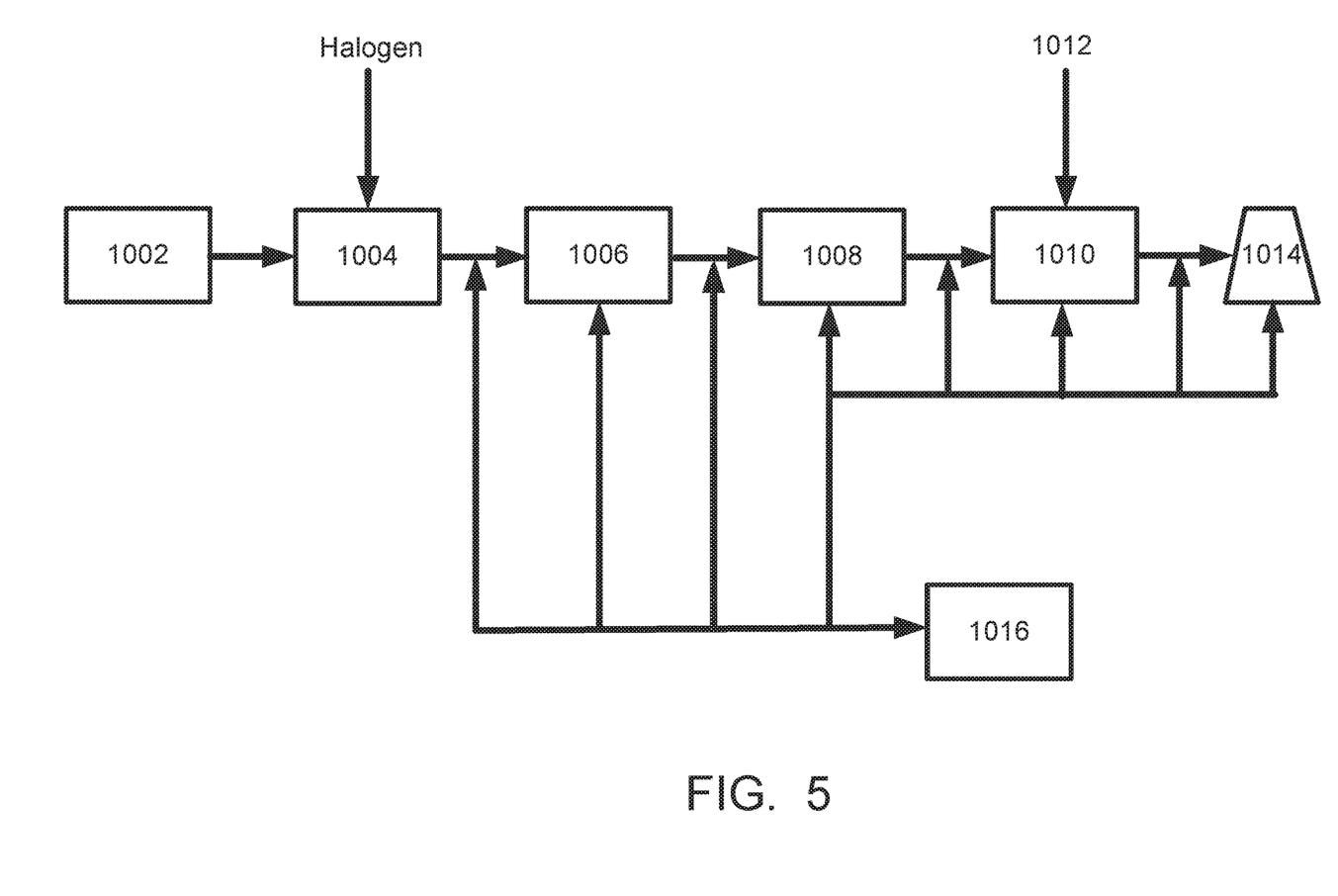
FIG. 5 is an illustration of a complete mercury oxidation and mercury emission control system of the present invention according to one embodiment of the present invention.

FIG. 5 is an illustration of one method of the present invention that can achieve a control-loop and/or control feedback method of achieving a desired level of compliance with regard to mercury emissions.

In one embodiment, coal 1002 is added to a pulverizer 1004 where it is ground up prior to entrance to the boiler 1006 where it is burned. A halogen-containing compound such as a bromine-containing compound (e.g., $CaBr_2$) is added by, for example, injecting the bromine-containing compound into the at least one coal pulverizer 1004 at such a level to achieve a bromine concentration in the flue gas, or combustion gas, stream based on the amount of mercury present in the fuel source (e.g., coal, fuel oil, other fossil fuels, biomass, or a blend of biomass with one or more fossil fuels, etc.) of between about 0.5 ppm to about 250 ppm, or between about 1 ppm to about 237.5 ppm, or between about 2.5 ppm to about 225 ppm, or between about 5 ppm to about 212.5 ppm, or between about 7.5 ppm to about 200 ppm, or between about 10 ppm to about 187.5 ppm, or between about 12.5 ppm to about 175 ppm, or between about 15 ppm to about 162.5 ppm, or between about 17.5 ppm to about 150 ppm, or between about 20 ppm to about 137.5 ppm, or between about 22.5 ppm to about 125 ppm, or between about 25 ppm to about 112.5 ppm, or between about 27.5 ppm to about 100 ppm, or between about 30 ppm to about 87.5 ppm, or between about 32.5 ppm to about 75 ppm, or between about 35 ppm to about 62.5 ppm, or between about 37.5 ppm to about 50 ppm, or between about 40 ppm to about 47.5 ppm, or even about 45 ppm. Here, as well as elsewhere in the specification and claims, individual range values can be combined to form additional and/or non-disclosed ranges.

In another embodiment, coal 1002 is added to a pulverizer 1004 where it is ground up prior to entrance to the boiler 1006 where it is burned. In this embodiment, one or more halogen-containing compounds selected from any of various halogen-containing compounds disclosed herein is/are added by, for example, injecting such one or more halogen-containing compound, or compounds, into the at least one coal pulverizer 1004 at such a level to achieve a halogen concentration in the flue gas, or combustion gas, stream based on the amount of mercury present in the fuel source (e.g., coal, fuel oil, other fossil fuels, biomass, or a blend of biomass with one or more fossil fuels, etc.) of between about 5 ppm to about 250 ppm, or between about 7.5 ppm to about 237.5 ppm, or between about 10 ppm to about 225 ppm, or between about 12.5 ppm to about 212.5 ppm, or between about 15 ppm to about 200 ppm, or between about 17.5 ppm to about 187.5 ppm, or between about 20 ppm to about 175 ppm, or between about 22.5 ppm to about 162.5 ppm, or between about 25 ppm to about 150 ppm, or between about 27.5 ppm to about 137.5 ppm, or between about 30 ppm to about 125 ppm, or between about 32.5 ppm to about 112.5 ppm, or between about 35 ppm to about 100 ppm, or between about 37.5 ppm to about 87.5 ppm, or between about 40 ppm to about 75 ppm, or between about 42.5 ppm to about 62.5 ppm, or between about 45 ppm to about 55 ppm, or even about 50 ppm. Here, as well as elsewhere in the specification and claims, individual range values can be combined to form additional and/or non-disclosed ranges.

As noted above, although FIG. 5 illustrates injection of the bromine-containing compound into the coal pulverizer, the present invention is not limited thereto but can be anywhere prior to entrance of the flue gas into a wet, or dry, scrubber. The bromine (or another bromine-containing compound, or even another halogen-containing compound, or even a combination of one or more of the same and/or different halogen-containing compounds) helps to oxidize the mercury that is contained within the coal, such that it presents itself in the flue gas as $Hg^{2+}$, making it much easier to capture in the downstream environmental equipment. While some fraction of the oxidized mercury is captured in the particulate collection device 1008, the WFGD system 1010 can remove most of the remainder of the $Hg^{2+}$ in the WFGD absorber. However, within the WFGD 1010 system, the slurry liquid can become saturated with mercury, requiring the addition of at least one precipitating agent 1012. Once the WFGD 1010 liquid is sub-saturated with respect to mercury, stack 1014 Hg MATS compliance can only be met so long as the WFGD 1010 absorber inlet flue gas elemental mercury $Hg^0$ concentration is below the mercury MATS limit. As is also illustrated in FIG. 5, the system and/or method of the present invention utilizes a control device 1016 that is connected to one or more mercury sensing devices or sensors, and/or receives mercury concentration and/or speciation data from one or more points in the boiler and/or AQCS train so as to enable the integrated control, or even real-time integrated control, of the mercury oxidation method in conjunction with the mercury precipitation method of the present invention thereby resulting in a desired level of mercury emission compliance at stack 1014 and/or mercury capture in the overall boiler/furnace and/or in one or more AQCS devices or flues attached thereto. As per FIG. 5 the location of the one or more mercury sensing devices or sensors discussed herein can be located at one or more of the various locations denoted by the arrows that come out of control device 1016 and end at the various positions in the flue gas stream and/or one or more of the devices of the AQCS train. The arrow head that points back to control device 1016 denotes the fact that various mercury concentration, speciation and/or other mercury-related data "flows" back to control device 1016 so as to permit real-time control of the injection of one or more halogen-containing compounds discussed herein and/or the injection of one or more aqueous sulfide compounds or species and/or sulfide salt compounds discussed herein.

It should be noted that although FIG. 5 illustrates various components of a boiler/furnace system and some of its attenuated flues and/or AQCS devices, the present invention is not limited to just the illustrated layout. Rather, any furnace/boiler system known to those of skill in the art can be utilized in conjunction with the present invention. As such, the present invention can utilize feedback and/or data obtained from any number of furnace/boiler sources and/or AQCS device sources.

In another embodiment of the present invention, the bromine-containing compound noted above is replaced with one or more iodine-containing compounds. In this embodiment, much lower quantities of the one or more iodine-containing compounds (e.g., NaI) are able to achieve comparable, or even greater, levels of mercury oxidation than one or more bromine-containing compounds. Another advantage of utilizing lower levels of the one or more halogen-containing compounds to achieve a desired level of mercury oxidation in a flue gas, or combustion gas, stream is that the corrosion rate for the one or more iodine-containing compounds while achieving an equivalent, or even greater, mercury oxidation rate (or level) is lower. This addresses an increasing important issue that concerns, for example, utility customers as such increased corrosion in downstream AQCS devices and/or other systems is highly undesirable.

Halogen Testing Results

| Run | Injection Periods | Stack (μg/dscm) Oxidized | Stack (μg/dscm) Elemental | Total | % of Total Hg Oxidized | Rate of corrosion mil/hr |
|---|---|---|---|---|---|---|
| 1 | 0 (baseline) | 1.89 | 1.87 | 3.76 | 50.30% | 0.004 |
| 2 | 0 (baseline) | 2.0* | 1.97* | 3.75* | 50.4%* | |
| 3 | 0 (baseline) | Not available, used two unspeciated traps | | 3.54 | NA | |
| 4 | 0 (baseline) | 1.87* | 1.61* | 3.60* | 53.8%* | |
| Average | | | | | 51.50% | |
| 5 | 150 ppm Bromine | 3.05 | 0.4 | 3.45 | 88.40% | 0.029 |
| 6 | 150 ppm Bromine | 3.18 | 0.18 | 3.36 | 94.90% | |
| 7 | 150 ppm Bromine | 3.23 | 0.3 | 3.53 | 91.50% | |
| 8 | 150 ppm Bromine | 3.53 | 0.1 | 3.63 | 97.30% | |
| 9 | 150 ppm Bromine | 5.01 | 0.13 | 5.13 | 97.60% | |
| 10 | 150 ppm Bromine | 2.78 | 0.08 | 2.86 | 97.20% | |
| Average | | | | | 94.50% | |
| 11 | 0 (baseline) | 1.14 | 0.91 | 2.04 | 55.50% | |
| 12 | 10 ppm Iodine | 4.90* | 0.49* | 5.39* | 90.9%* | |
| 13 | 10 ppm Iodine | 3.95 | 0.14 | 4.09 | 96.50% | 0.004 |
| Average | | | | | 93.70% | |
| 14 | 25 ppm Iodine | 4.58* | 0.04* | 4.62* | 99.0%* | 0.008 |
| 15 | 25 ppm Iodine | 4.03 | 0 | 4.03 | 100.00% | |
| Average | | | | | 99.50% | |
| 16 | 25 ppm Bromine | 1.02 | 0.33 | 1.35 | 75.30% | 0.006 |
| 17 | 25 ppm Bromine | 2.31 | 0.5 | 2.82 | 82.10% | |
| Average | | | | | 78.70% | |
| 18 | 75 ppm Bromine | 2.5 | 0.51 | 3.01 | 83.10% | 0.01 |
| 19 | 75 ppm Bromine | 2.46 | 0.46 | 2.92 | 84.20% | |
| Average | | | | | 83.70% | |

Thus, in one embodiment, the present invention relates to various methods that permit one to achieve a desired level of mercury control via oxidation of elemental mercury in a flue gas, or combustion gas, stream as detailed herein while simultaneously realizing a rate of corrosion in various AQCS devices and conduits that is equal to or only slightly more than the rate of corrosion realized without injection of one or more halogen-containing compounds for mercury oxidation. It should be understood for the following discussion that although the differences in the corrosion rates covered by the methods of the present invention when viewed in terms of percentage difference, or percentage increase over baseline, show large numerical increases such increases while seemingly large only translate into slight increase in the real rate of corrosion expressed as mil per hour. Given this, the rates of corrosion obtained by the various methods of the present invention will be expressed in numerical values stated in mil per hour. In one embodiment the present invention achieves the simultaneous oxidation of elemental mercury at one or more of the levels discussed herein while also achieving a corrosion rate of between about 0.001 mil/hour to about 0.05 mil/hour, or between about 0.0015 mil/hour to about 0.045 mil/hour, or between about 0.002 mil/hour to about 0.04 mil/hour, or between about 0.0025 mil/hour to about 0.035 mil/hour, or between about 0.003 mil/hour to about 0.03 mil/hour, or between about 0.0035 mil/hour to about 0.025 mil/hour, or between about 0.004 mil/hour to about 0.02 mil/hour, or between about 0.0045 mil/hour to about 0.015 mil/hour, or between about 0.005 mil/hour to about 0.01 mil/hour, or between about 0.0055 mil/hour to about 0.0095 mil/hour, or between about 0.006 mil/hour to about 0.009 mil/hour, or between about 0.006 mil/hour to about 0.0085 mil/hour, or between about 0.0065 mil/hour to about 0.008 mil/hour, or even between about 0.007 mil/hour to about 0.0075 mil/hour. Here, as well as elsewhere in the specification and claims, individual range values can be combined to form additional and/or non-disclosed ranges.

While specific embodiments of the present invention have been shown and described in detail to illustrate the application and principles of the invention, it will be understood that it is not intended that the present invention be limited thereto and that the invention may be embodied otherwise without departing from such principles. In some embodiments of the invention, certain features of the invention may sometimes be used to advantage without a corresponding use of the other features. Accordingly, all such changes and embodiments properly fall within the scope of the following claims.

What is claimed is:

1. A method for oxidizing elemental mercury present in a flue gas, or combustion gas, stream wherein the method comprises the steps of:
    (I) burning at least one fuel so as to yield a mercury-containing flue gas, or combustion gas, stream wherein at least a portion of the mercury in the mercury-containing flue gas, or combustion gas, stream is elemental mercury;
    (II) injecting one or more halogen-containing compounds into the mercury-containing flue gas, or combustion gas, stream in order to oxidize at least a portion of the elemental mercury in the mercury-containing flue gas, or combustion gas, stream into oxidized mercury and form one or more corresponding mercury halide compounds;
    (III) injecting one or more sulfur-containing compounds and/or sulfide salt compounds into at least one air quality control device in order to convert the one or more mercury halide compounds into one or more mercury-sulfur compounds that is, or are, insoluble in an aqueous environment or an aqueous-based environment;
    (IV) supplying at least one control device and one or more real-time mercury sensing devices, or sensors, wherein the at least one control device is operatively connected to the one or more real-time mercury sensing devices, or sensors, in order to provide real-time data on at least two of: (i) oxidized mercury concentration level in the flue gas, or combustion gas, stream, (ii) elemental mercury concentration level in the flue gas, or combustion gas, stream, and/or (iii) mercury speciation levels in the flue gas, or combustion gas, stream;
    (V) using the real-time data from Step (IV) to determine the amount of both of: (a) the one or more halogen-containing compounds that are injected in Step (II), and (b) the one or more sulfur-containing compounds and/or sulfide salt compounds that are injected in Step (III) into the at least one air quality control device.

2. The method of claim 1, wherein the at least one fuel is selected from at least one fossil fuel.

3. The method of claim 2, wherein the at least one fossil fuel is coal.

4. The method of claim 1, wherein the fuel is at least one biomass fuel.

5. The method of claim 1, wherein the fuel is a mixture of at least one fossil fuel and at least one biomass fuel.

6. The method of claim 1, wherein the one or more halogen-containing compounds are selected from one or more chlorine-containing compounds, one or more bromine-containing compounds, one or more iodine-containing compounds, or any combination of two or more thereof, three or more thereof, four or more thereof, or even five or more thereof.

7. The method of claim 6, wherein the one or more chlorine-containing compounds are selected from one or more inorganic chlorine compounds, organic chlorine-containing compounds, one or more diatomic chlorine compounds, or any combination of two or more thereof, three or more thereof, four or more thereof, or even five or more thereof.

8. The method of claim 6, wherein the one or more bromine-containing compounds are selected from one or more inorganic bromine compounds, organic bromine-containing compounds, one or more diatomic bromine compounds, or any combination of two or more thereof, three or more thereof, four or more thereof, or even five or more thereof.

9. The method of claim 6, wherein the one or more iodine-containing compounds are selected from one or more inorganic iodine compounds, organic iodine-containing compounds, one or more diatomic iodine compounds, or any combination of two or more thereof, three or more thereof, four or more thereof, or even five or more thereof.

10. The method of claim 6, wherein the one or more halogen-containing compounds are selected from a combination of at least one chlorine-containing compound in combination with at least one bromine-containing compound and in further combination with at least one iodine-containing compound.

11. The method of claim 6, wherein the one or more halogen-containing compounds are selected from any suitable combination of one or more alkali-metal halide compounds, one or more alkali-metal halogen-containing compounds, one or more alkali-earth halogen-containing compounds, one or more compounds that contain at least two different halogens, one or more compounds that contain at least one halogen and oxygen, one or more compounds that contain at least one halogen and hydrogen, one or more diatomic halogen-containing compounds, one or more organic compounds that contain therein at least one atom of chlorine, bromine, and/or iodine, or any combination of two or more thereof, or even all three thereof.

12. The method of claim 6, wherein the one or more halogen-containing compounds are selected from NaCl, NaBr, NaI, KCl, KBr, KI, $NaClO_2$, $NaClO_3$, $NaClO_4$, $NaBrO_3$, $NaIO_3$, $NaIO_4$, $Na_5IO_6$, $Na_3H_2IO_6$, KClO, $KClO_3$, $KClO_4$, $KBrO_3$, $KIBr_2$, $KIO_3$, $KIO_3.HIO_3$, $KIO_3.2HIO_3$, $KIO_4$, $KI_3.½H_2O$, $MgCl_2$, $MgBr_2$, $MgI_2$, $CaCl_2$, $CaBr_2$, $CaI_2$, $Ca(ClO_3)_2$, $(CaClO_4)_2$, $Ca(BrO_3)_2$, $Ca(IO_3)_2$, $BrCl$, $IBr$, $IBr_3$, $ICl$, $ICl_3$, $ClO_2$, $Cl_2O_7$, $Cl_2O$, $ClO_4$, $Cl_2O_8$, $BrO_2$, $Br_2O$, $Br_3O_8$, $IO_2$, $I_2O_4$, $I_2O_5$, $I_4O_9$, $HCl$, $HClO_3$, $HClO_4$, $HBr$, $HBrO_3$, $HI$, $HIO_3$, $Cl_2$, $Br_2$, $I_2$, or any suitable combination of two or more thereof, three or more thereof, four or more thereof, or even five or more thereof.

13. The method of claim 1, wherein the one or more sulfur-containing compounds and/or sulfide salt compounds are selected from sulfidic waste water, kraft caustic liquor, kraft carbonate liquor, potassium sulfide, sodium sulfide, sodium hydrogen sulfide (NaHS), thioacetamide, or any combination of two or more thereof, three of more thereof, four or more thereof, or even five or more thereof.

14. The method of claim 13, wherein the one or more sulfur-containing compounds and/or sulfide salt compounds are supplied as an aqueous solution.

15. The method of claim 1, wherein the one or more halogen-containing compounds are injected at a rate of between about 0.5 ppm to about 250 ppm based on the amount of mercury present in the fuel source.

16. The method of claim 1, wherein the one or more halogen-containing compounds are injected at a rate of between about 2.5 ppm to about 225 ppm based on the amount of mercury present in the fuel source.

17. The method of claim 1, wherein the one or more halogen-containing compounds are injected at a rate of between about 5 ppm to about 212.5 ppm based on the amount of mercury present in the fuel source.

18. The method of claim 1, wherein the one or more halogen-containing compounds are injected at a rate of between about 17.5 ppm to about 150 ppm based on the amount of mercury present in the fuel source.

19. The method of claim 1, wherein the one or more halogen-containing compounds are injected at a rate of between about 32.5 ppm to about 75 ppm based on the amount of mercury present in the fuel source.

20. The method of claim 1, wherein the at least about 50 weight percent of the elemental mercury in the flue gas, or combustion gas, stream is oxidized by the injection of the one or more halogen-containing compounds.

21. The method of claim 1, wherein the at least about 75 weight percent of the elemental mercury in the flue gas, or combustion gas, stream is oxidized by the injection of the one or more halogen-containing compounds.

22. The method of claim 1, wherein the at least about 85 weight percent of the elemental mercury in the flue gas, or combustion gas, stream is oxidized by the injection of the one or more halogen-containing compounds.

23. The method of claim 1, wherein the at least about 90 weight percent of the elemental mercury in the flue gas, or combustion gas, stream is oxidized by the injection of the one or more halogen-containing compounds.

24. The method of claim 1, wherein the at least about 95 weight percent of the elemental mercury in the flue gas, or combustion gas, stream is oxidized by the injection of the one or more halogen-containing compounds.

25. The method of claim 1, wherein the at least about 97.5 weight percent of the elemental mercury in the flue gas, or combustion gas, stream is oxidized by the injection of the one or more halogen-containing compounds.

26. The method of claim 1, wherein the at least about 98 weight percent of the elemental mercury in the flue gas, or combustion gas, stream is oxidized by the injection of the one or more halogen-containing compounds.

27. The method of claim 1, wherein the corrosion rate of any metal material or conduit due to contact with the halogen-containing flue gas, or combustion gas, stream is between about 0.001 mil/hour to about 0.05 mil/hour.

28. The method of claim 1, wherein the corrosion rate of any metal material or conduit due to contact with the halogen-containing flue gas, or combustion gas, stream is between about 0.0015 mil/hour to about 0.045 mil/hour.

29. A method for oxidizing and capturing elemental mercury present in a flue gas, or combustion gas, stream wherein the method comprises the steps of:
(A) burning at least one fuel so as to yield a mercury-containing flue gas, or combustion gas, stream wherein at least a portion of the mercury in the mercury-containing flue gas, or combustion gas, stream is elemental mercury;
(B) injecting one or more halogen-containing compounds into the mercury-containing flue gas, or combustion gas, stream in order to oxidize at least a portion of the elemental mercury in the mercury-containing flue gas, or combustion gas, stream into oxidized mercury and form one or more corresponding mercury halide compounds;
(C) injecting one or more sulfur-containing compounds and/or sulfide salt compounds into at least one air quality control device in order to convert the one or more mercury halide compounds into one or more mercury-sulfur compounds that is, or are, insoluble in an aqueous environment or an aqueous-based environment;
(D) capturing the one or more insoluble mercury-sulfur compounds in at least one air quality control device and/or downstream process equipment device;
(E) supplying at least one control device and one or more real-time mercury sensing devices, or sensors, wherein the at least one control device is operatively connected to the one or more real-time mercury sensing devices, or sensors, in order to provide real-time data on at least two of: (i) oxidized mercury concentration level in the flue gas, or combustion gas, stream, (ii) elemental mercury concentration level in the flue gas, or combustion gas, stream, and/or (iii) mercury speciation levels in the flue gas, or combustion gas, stream; and
(F) using the real-time data from Step (E) to determine the amount of both of: (a) the one or more halogen-containing compounds that are injected in Step (B), and (b) the one or more sulfur-containing compounds and/or sulfide salt compounds that are injected in Step (C) into the at least one air quality control device.

30. The method of claim 29, wherein the at least one fuel is selected from at least one fossil fuel.

31. The method of claim 30, wherein the at least one fossil fuel is coal.

32. The method of claim 29, wherein the fuel is at least one biomass fuel.

33. The method of claim 29, wherein the fuel is a mixture of at least one fossil fuel and at least one biomass fuel.

34. The method of claim 29, wherein the one or more halogen-containing compounds are selected from one or more chlorine-containing compounds, one or more bromine-containing compounds, one or more iodine-containing compounds, or any combination of two or more thereof, three or more thereof, four or more thereof, or even five or more thereof.

35. The method of claim 34, wherein the one or more chlorine-containing compounds are selected from one or more inorganic chlorine compounds, organic chlorine-containing compounds, one or more diatomic chlorine compounds, or any combination of two or more thereof, three or more thereof, four or more thereof, or even five or more thereof.

36. The method of claim 34, wherein the one or more bromine-containing compounds are selected from one or more inorganic bromine compounds, organic bromine-containing compounds, one or more diatomic bromine compounds, or any combination of two or more thereof, three or more thereof, four or more thereof, or even five or more thereof.

37. The method of claim 34, wherein the one or more iodine-containing compounds are selected from one or more inorganic iodine compounds, organic iodine-containing compounds, one or more diatomic iodine compounds, or any combination of two or more thereof, three or more thereof, four or more thereof, or even five or more thereof.

38. The method of claim 34, wherein the one or more halogen-containing compounds are selected from a combination of at least one chlorine-containing compound in combination with at least one bromine-containing compound and in further combination with at least one iodine-containing compound.

39. The method of claim 34, wherein the one or more halogen-containing compounds are selected from any suitable combination of one or more alkali-metal halide compounds, one or more alkali-metal halogen-containing compounds, one or more alkali-earth halogen-containing compounds, one or more compounds that contain at least two different halogens, one or more compounds that contain at least one halogen and oxygen, one or more compounds that contain at least one halogen and hydrogen, one or more diatomic halogen-containing compounds, one or more organic compounds that contain therein at least one atom of chlorine, bromine, and/or iodine, or any combination of two or more thereof, or even all three thereof.

40. The method of claim 34, wherein the one or more halogen-containing compounds are selected from NaCl, NaBr, NaI, KCl, KBr, KI, $NaClO_2$, $NaClO_3$, $NaClO_4$, $NaBrO_3$, $NaIO_3$, $NaIO_4$, $Na_5IO_6$, $Na_3H_2IO_6$, KClO, $KClO_3$, $KClO_4$, $KBrO_3$, $KIBr_2$, $KIO_3$, $KIO_3 \cdot HIO_3$, $KIO_3 \cdot 2HIO_3$, $KIO_4$, $KI_3 \cdot \frac{1}{2}H_2O$, $MgCl_2$, $MgBr_2$, $MgI_2$, $CaCl_2$, $CaBr_2$, $CaI_2$, $Ca(ClO_3)_2$, $(CaClO_4)_2$, $Ca(BrO_3)_2$, $Ca(IO_3)_2$, BrCl, IBr, $IBr_3$, ICl, $ICl_3$, $ClO_2$, $Cl_2O_7$, $Cl_2O$, $ClO_4$, $Cl_2O_8$, $BrO_2$, $Br_2O$, $Br_3O_8$, $IO_2$, $I_2O_4$, $I_2O_5$, $I_4O_9$, HCl, $HClO_3$, $HClO_4$, HBr, $HBrO_3$, HI, $HIO_3$, $Cl_2$, $Br_2$, $I_2$, or any suitable combination of two or more thereof, three or more thereof, four or more thereof, or even five or more thereof.

41. The method of claim 29, wherein the one or more sulfur-containing compounds and/or sulfide salt compounds are selected from sulfidic waste water, kraft caustic liquor, kraft carbonate liquor, potassium sulfide, sodium sulfide, sodium hydrogen sulfide (NaHS), thioacetamide, or any combination of two or more thereof, three of more thereof, four or more thereof, or even five or more thereof.

42. The method of claim 41, wherein the one or more sulfur-containing compounds and/or sulfide salt compounds are supplied as an aqueous solution.

43. The method of claim 29, wherein the one or more halogen-containing compounds are injected at a rate of between about 0.5 ppm to about 250 ppm based on the amount of mercury present in the fuel source.

44. The method of claim 29, wherein the one or more halogen-containing compounds are injected at a rate of between about 2.5 ppm to about 225 ppm based on the amount of mercury present in the fuel source.

45. The method of claim 29, wherein the one or more halogen-containing compounds are injected at a rate of between about 5 ppm to about 212.5 ppm based on the amount of mercury present in the fuel source.

46. The method of claim 29, wherein the one or more halogen-containing compounds are injected at a rate of between about 17.5 ppm to about 150 ppm based on the amount of mercury present in the fuel source.

47. The method of claim 29, wherein the one or more halogen-containing compounds are injected at a rate of between about 32.5 ppm to about 75 ppm based on the amount of mercury present in the fuel source.

48. The method of claim 29, wherein the at least about 50 weight percent of the elemental mercury in the flue gas, or combustion gas, stream is oxidized by the injection of the one or more halogen-containing compounds.

49. The method of claim 29, wherein the at least about 75 weight percent of the elemental mercury in the flue gas, or combustion gas, stream is oxidized by the injection of the one or more halogen-containing compounds.

50. The method of claim 29, wherein the at least about 85 weight percent of the elemental mercury in the flue gas, or combustion gas, stream is oxidized by the injection of the one or more halogen-containing compounds.

51. The method of claim 29, wherein the at least about 90 weight percent of the elemental mercury in the flue gas, or combustion gas, stream is oxidized by the injection of the one or more halogen-containing compounds.

52. The method of claim 29, wherein the at least about 95 weight percent of the elemental mercury in the flue gas, or combustion gas, stream is oxidized by the injection of the one or more halogen-containing compounds.

53. The method of claim 29, wherein the at least about 97.5 weight percent of the elemental mercury in the flue gas, or combustion gas, stream is oxidized by the injection of the one or more halogen-containing compounds.

54. The method of claim 29, wherein the at least about 98 weight percent of the elemental mercury in the flue gas, or combustion gas, stream is oxidized by the injection of the one or more halogen-containing compounds.

55. The method of claim 29, wherein the corrosion rate of any metal material or conduit due to contact with the halogen-containing flue gas, or combustion gas, stream is between about 0.001 mil/hour to about 0.05 mil/hour.

56. The method of claim 29, wherein the corrosion rate of any metal material or conduit due to contact with the halogen-containing flue gas, or combustion gas, stream is between about 0.0015 mil/hour to about 0.045 mil/hour.

57. The method of claim 29, wherein the at least one air quality control device is selected from a particulate control device selected from one or more of a fabric filter, a pulse-jet fabric filter, a baghouse, a wet electrostatic precipitator, a dry electrostatic precipitator, or any suitable combination of two or more thereof.

* * * * *